US008489998B2

(12) United States Patent
Tevelev et al.

(10) Patent No.: US 8,489,998 B2
(45) Date of Patent: Jul. 16, 2013

(54) METHOD, APPARATUS AND SYSTEM FOR COORDINATED CONTENT DISTRIBUTION WORKFLOW

(75) Inventors: Alex Tevelev, Pleasanton, CA (US); Omer Yosef Shatil, San Francisco, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 805 days.

(21) Appl. No.: 12/449,903

(22) PCT Filed: Mar. 8, 2007

(86) PCT No.: PCT/US2007/005752
§ 371 (c)(1),
(2), (4) Date: Sep. 1, 2009

(87) PCT Pub. No.: WO2008/108759
PCT Pub. Date: Sep. 12, 2008

(65) Prior Publication Data
US 2010/0095222 A1 Apr. 15, 2010

(51) Int. Cl.
*G06F 3/00* (2006.01)
(52) U.S. Cl.
USPC ........... 715/748; 715/810; 715/719; 715/716; 709/201; 709/231
(58) Field of Classification Search
USPC ................. 715/716, 719, 733, 748, 764, 765, 715/810; 705/14.4, 14.49; 709/200, 201, 709/203, 231; 725/32, 37, 41, 42, 74
See application file for complete search history.

(56) References Cited

U.S. PATENT DOCUMENTS

| 6,216,173 B1 * | 4/2001 | Jones et al. ................... 715/705 |
| 6,418,441 B1 * | 7/2002 | Call ............................... 705/23 |
| 6,622,305 B1 | 9/2003 | Willard |
| 6,985,452 B2 * | 1/2006 | Marshall et al. .............. 370/310 |

(Continued)

FOREIGN PATENT DOCUMENTS

| EP | 1376913 | 1/2004 |
| JP | 2001148831 | 5/2001 |

(Continued)

OTHER PUBLICATIONS

"Automating Media Ingest and Reformatting for Media Asset Management Applications", Apr. 24, 2002; Telestream White Paper, 5 pages.*

(Continued)

*Primary Examiner* — Xiomar L Bautista
(74) *Attorney, Agent, or Firm* — Robert D. Shedd; Jorge Tony Villabon (57) ABSTRACT

A method, apparatus and system for coordinated content distribution include identifying a respective content type and a destination for the content to be distributed, selecting a respective packaging service for packaging the content based on at least the content type and selecting a respective delivery service for distribution of the content based on at least the destination of the content. In various embodiments, when content is ready for packaging a request is communicated to the selected respective packaging service. Subsequently, a request for delivery is communicated to the selected delivery service for delivering the packaged content, The present invention provides an automated media distribution workflow that controls and monitors automated distribution tasks which are integrated with user driven tasks.

28 Claims, 9 Drawing Sheets

U.S. PATENT DOCUMENTS

| | | |
|---|---|---|
| 2002/0067914 A1 | 6/2002 | Schumann et al. |
| 2002/0147979 A1 | 10/2002 | Corson |
| 2003/0010819 A1* | 1/2003 | Sako .......................... 235/379 |
| 2003/0048750 A1* | 3/2003 | Kobayashi ................... 370/229 |
| 2004/0190515 A1 | 9/2004 | Nogima et al. |
| 2004/0213218 A1* | 10/2004 | Dougherty et al. ........... 370/386 |
| 2005/0094809 A1 | 5/2005 | Pedlow, Jr. et al. |
| 2007/0280279 A1 | 12/2007 | Mituhasi et al. |
| 2008/0209491 A1* | 8/2008 | Hasek ......................... 725/114 |
| 2010/0246667 A1* | 9/2010 | Buehl et al. .............. 375/240.01 |

FOREIGN PATENT DOCUMENTS

| | | |
|---|---|---|
| JP | 2002335509 | 11/2002 |
| JP | 2003524349 | 8/2003 |
| JP | 2005-506741 | 3/2005 |
| JP | 2006-260471 | 9/2006 |
| WO | 03/032626 A1 | 4/2003 |
| WO | WO03098895 | 11/2003 |
| WO | 2005/046203 A2 | 5/2005 |
| WO | 2006/030821 A1 | 3/2006 |

OTHER PUBLICATIONS

International Search Report, dated Oct. 30, 2007.

* cited by examiner

METHOD, APPARATUS AND SYSTEM FOR COORDINATED CONTENT DISTRIBUTION WORKFLOW

This application claims the benefit, under 35 U.S.C. §365 of International Application PCT/US2007/005752 filed Mar. 8, 2007 which was published in accordance with PCT Article 21(2) on Sep. 12, 2008 in English.

TECHNICAL FIELD

The present invention generally relates to the distribution of media content, and more particularly, to a method, apparatus and system for providing a coordinated content distribution workflow.

BACKGROUND OF THE INVENTION

Content distribution systems are used to provide content to a plurality of end systems. For example, in video-on-demand applications media content has been made available to and utilized by satellite/cable television subscribers. Typically, subscribers can view at their television the video programs available for selection (sometimes for an additional fee) and upon selection made at the subscriber's set-top-box (STB), the program is sent from the program center to the set-top-box via the cable or satellite network. That is, in such content distribution systems, a selection has to be made at the point of display for determining media content to be viewed.

Similarly, in the advertising realm, providing in-store retail media content is becoming the most popular advertising medium in use today, with broadcast distribution being its primary, means of content presentation. That is, in recent years retailers and the managers of public spaces have brought in video display systems for advertising use. In such systems, content is distributed by a server and received at a respective set-top-box for each display or group of displays. Retailers use the displays to present their current offerings or sale information, while the public spaces sell time on the video displays to advertisers either national or local, knowing that large numbers of consumers will see the presentation.

However current distribution systems typically require a separate distribution session for each different type of transmission system implemented to distribute the media content and for each type of media package to be delivered to a specific intended location. That is, in current distribution systems each network (e.g., out-of-home network) is viewed as being unique for the type of playlist generation, packager, and delivery methods, and has specialized interfaces for each function for each network. For example, in a retail sales environment, a first commercial sales outlet may implement a satellite system for sending and receiving information while a second commercial sales outlet may implement a wide-area network (WAN) infrastructure. In current distribution systems, the distribution of media content to commercial sales outlets implementing different transmission systems must be handled separately, usually via completely unrelated distribution systems/sessions. Similarly, in current distribution systems different types of media packages, even if intended for a same final destination, are typically transmitted to that destination via completely separate and unrelated distribution systems/sessions.

As such, there is a need for a new type of content distribution system and workflow which overcomes the above described deficiencies in the state of the art as well as other related deficiencies and which provides for coordinated content distribution and validation across at least a variety of delivery schemes, playlist generation types and media types.

SUMMARY OF THE INVENTION

The various embodiments of the present invention address these and other deficiencies of the prior art by providing a method, apparatus and system for providing coordinated content distribution.

In one embodiment of the present invention, a method for coordinated content distribution includes identifying a content type and a content destination, selecting a respective packaging service for packaging the content based on at least the content type, and selecting a respective delivery service for distribution of the content to at least the identified destination based on at least the destination for the content. In one embodiment of the present invention, the method can further include communicating a request to a packaging service for packaging the content based on the content type, tracking the packaging progress and based on content and packaging results communicating a request with respective data to a delivery service for distribution of the content based on the content destination. In one embodiment, the content includes at least advertising media content and the content destination is a commercial/retail sales outlet.

In an alternate embodiment of the present invention, a distribution service manager for coordinated content distribution includes a communications service for receiving at least packaging and delivery requests and for communicating the packaging and delivery requests to at least one respective packaging and delivery service and a memory for storing programs and a processor for executing the programs. The distribution service manager is adapted to identify a respective content type and destination for the content, select a respective packaging service for packaging the content based on at least the content type and to communicate a packaging request for packaging of the content to the respective packaging service. The distribution service manager is further adapted to select a respective delivery service for distribution of the content to at least the identified destination based on at least the destination for the content and to communicate a delivery request for delivery of the content to said respective delivery service.

In an alternate embodiment of the present invention, a system for coordinated Content distribution includes a content manager for generating and organizing content and a media management system. The media management system includes a user interface for enabling user inputs including at least the selection of content and a destination for the content to be delivered, a scheduler for affecting the delivery of the selected content by communicating a packaging and delivery request for the selected content to a distribution service manager, and a database for storing at least the generated and organized content and packaging and delivery status information. The system for coordinated content distribution further includes at least one packaging service for packaging respective content, at least one delivery service for delivering respective content, and a distribution service manager. The distribution service manager of the system of the present invention includes a communications service for receiving the packaging and delivery requests from the media management system and for communicating the packaging and delivery requests to at least one of the respective packaging and delivery services, respectively, and a memory for storing programs and a processor for executing said programs. The processor of the distribution service manager when executing the programs is adapted to identify a respective content type and destination for content to be packaged and delivered, select a respective packaging service for packaging the content based on at least the content type and communicate a packaging request for packaging of the content to the respective packaging service, and select a respective delivery service for distribution of the content to at least the identified destination based on at least the destination for the content and communicate a delivery request for delivery of the content to the respective delivery service.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for coordinated content distribution. Although the present invention will be described primarily within the context of the distribution of retail advertising material and media content, the specific embodiments of the present invention should not be treated as limiting the scope of the invention. It will be appreciated by those skilled in the art and informed by the teachings of the present invention that the concepts of the present invention can be advantageously applied for the distribution of substantially any content in any network environment. For example, the concepts of the present invention can be implemented in video-on-demand systems and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the at that the block diagrams presented herein represent conceptual views of illustrative system components and/or circuitry embodying the principles of the invention. Similarly; it will be appreciated that any flow charts, flow diagrams, state transition diagrams, pseudocode, and the like represent various processes which may be substantially represented in computer readable media and so executed by a computer or processor, whether or not such computer or processor is explicitly shown.

Figure 1:
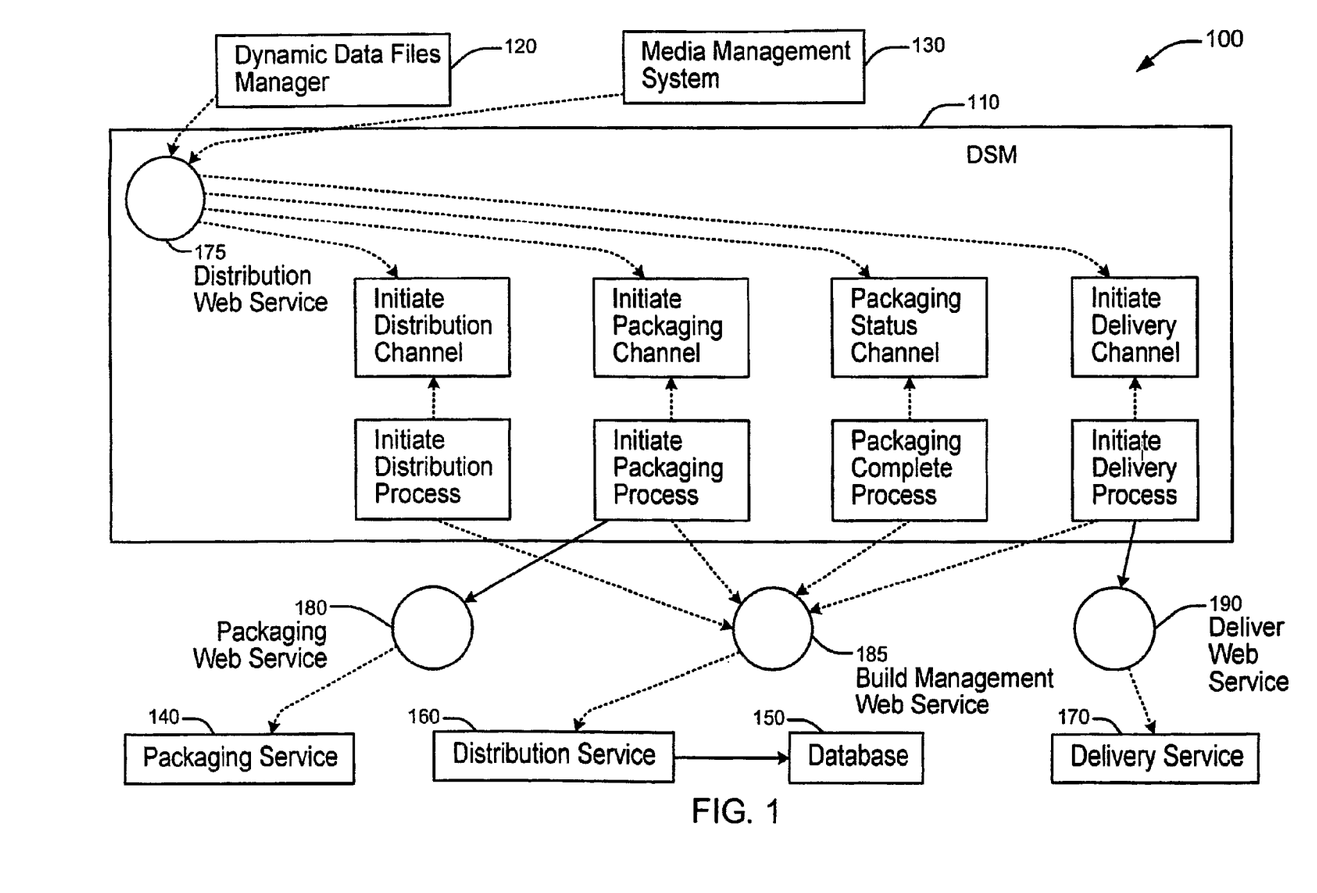
FIG. 1 depicts a high level block diagram of a content distribution workflow management system in accordance with an embodiment of the present invention.

FIG. 1 depicts a high level block diagram of a content distribution workflow management system in accordance with an embodiment of the present invention. The content distribution workflow management system 100 of FIG. 1 illustratively comprises a Distribution System Manager (DSM) 110, a Content (Dynamic Data Files) Manager 120, a Media Management System 130, a Packaging Service 140, a Delivery Service 170, a database 150 and a Distribution Service 160. The content distribution workflow management system 100 of FIG. 1 illustratively further comprises a communication system including at least a packaging web service 180, a delivery web service 185, and a build management web service 190. In the content distribution workflow management system 100 of FIG. 1, the DSM 110 includes a distribution web service 175 that provides all operations related to the distribution process, such as Initiate Distribution Channel, Initiate Packaging Channel, Packaging Complete Channel, Initiate Delivery Channel, Initiate Packaging request, Initiate Delivery request, Initiate Distribution request (Packaging and Delivery), Set Packaging completion status request, Get Packaging Status request and the like. In addition, in the content distribution workflow management system 100 of FIG. 1, the packaging web service 180 provides an interface for requesting packaging services from the packaging service 140, the delivery web service 185 provides an interface for requesting delivery services from the delivery service 170 and the build management web service 190 is an interface for build management processes that persist build information and provide build related Data Services for content distribution workflow management system components such as the Distribution service 160.

Although in the content distribution workflow management system 100 of FIG. 1 a single packaging service 140 and delivery service 170 are depicted, in alternate embodiments of a content distribution workflow management system of the present invention, a plurality of packaging services 140 and delivery services 170 can be implemented. Furthermore, although in the content distribution workflow management system 100 of FIG. 1 a web service is depicted as the communication system, the present system should not be limited as such. In alternate embodiments of the present invention, other communication systems such as asynchronous messaging system (for example JMS), remote procedure call (RPC), remote method invocation (RMI) and the like can be used for communication services.

In the content distribution workflow management system 100 of FIG. 1, the DSM 110 coordinates and controls the packaging and delivery of content and programs (i.e., Dynamic Data Files such as advertising content) from, in one embodiment, the Dynamic Data Files Manger 120 to a final destination (e.g., a commercial/retail sales outlet) using, in one embodiment, the infrastructure of the media management system 130. For example, the Dynamic Data Files Manager can generate content multiple and distinct playlists to be packed and delivered to specific destinations for ultimate display in, for example, an in-store advertising environment.

The DSM 110 coordinates and controls the packaging and delivery of the various possible types of content (e.g., playlists) to be delivered using various types of delivery means by coordinating the utilization of a proper packaging service and a proper delivery service for each type of respective content to be appropriately delivered to at least one respective final destination. That is, upon a request for packaging of content and/or programs, the DSM 110 selects a respective packaging service for fulfilling the received package request based on at least the content type to be packaged. More specifically, the DSM 110 selects a packaging service capable of properly packaging the selected content and/or programs to be distributed to a selected final destination(s). Furthermore, upon receiving a request for delivery of packaged content, the DSM 110 selects a respective delivery service for fulfilling the received delivery request based on at least the destination of the content to be delivered. As described above, the DSM 110 selects a delivery service capable of properly delivering the selected content to a selected final destination(s). In an alternate embodiment of the present invention, the DSM can also take into account the type of content to be delivered when selecting a proper delivery service. That is, in accordance with the present invention, a plurality of delivery services can be available to a DSM of the present invention for delivering content and it is possible that a specific delivery service is required for delivering a certain content type(s).

In one embodiment, the content can include content presented in compressed or uncompressed video and audio stream format (e.g., MPEG4/MPEG4 Part 10/AVC-H.264, VC-1, Windows Media, etc.), although the present system should not be limited to using only those formats. Furthermore, a distribution network in one embodiment of the present invention can utilize a distributed architecture and can provide centralized content management and distribution control via, for example, satellite, a wide-area network (WAN), the Internet, a series of microwave links, or similar means. As such, the DSM 110 selects an appropriate packaging service, delivery service, and the like depending on at least what type of content is to be packaged and delivered, and to where the content is being delivered. In previous such distribution networks, a separate distribution session was required for each different type of transmission system implemented to distribute/deliver the content and for each type of content to be distributed/delivered to a specific, intended location. Even further, separate packaging sessions were required depending on the type of content to be packaged.

Figure 8:
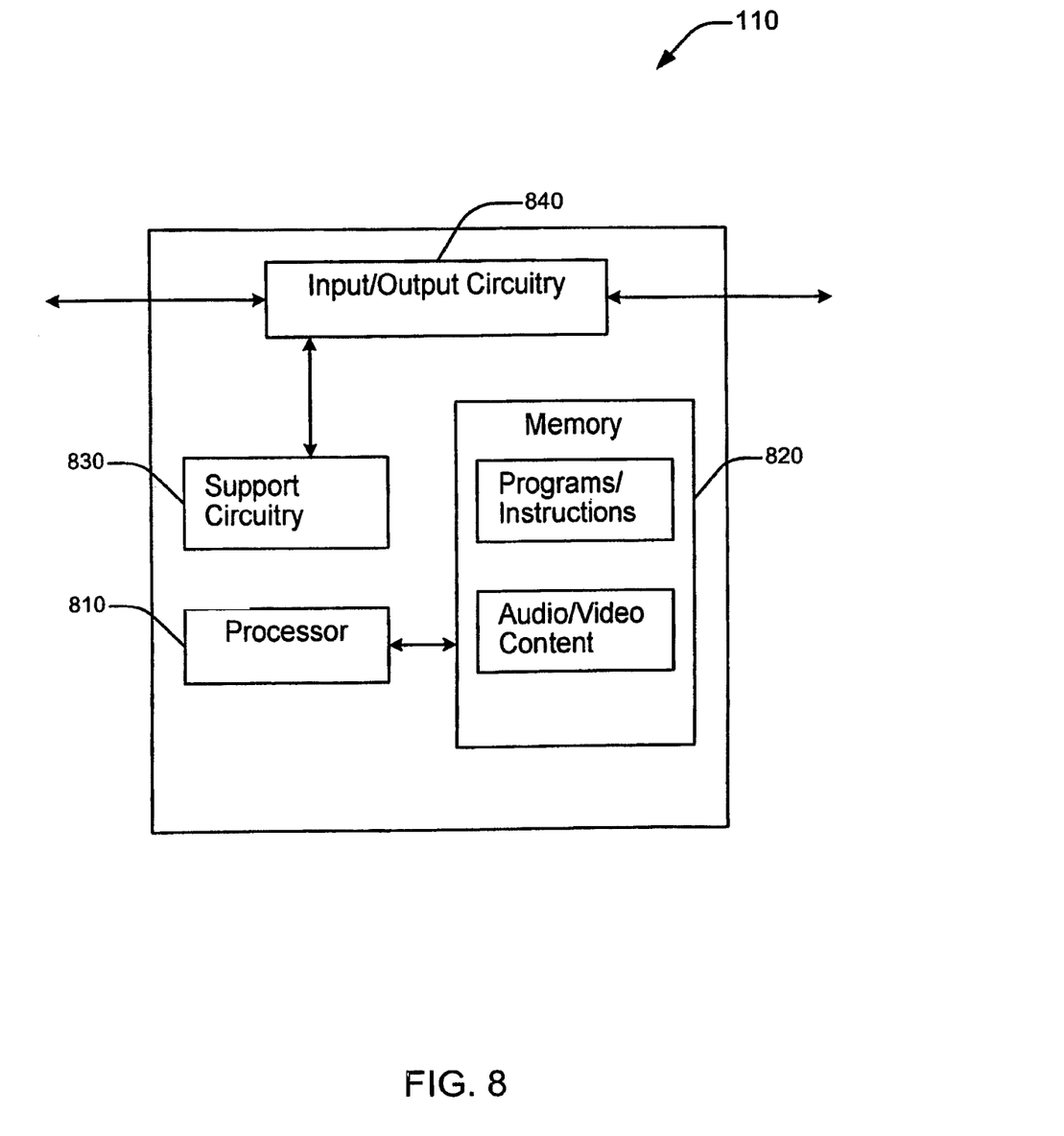
FIG. 8 depicts a high level block diagram of an embodiment of a distribution System Manager suitable for use in the content distribution workflow management system of FIG. 1 in accordance with the present invention.

FIG. 8 depicts a high level block diagram of an embodiment of a DSM 110 suitable for use in the content distribution workflow management system 100 of FIG. 1 in accordance with the present invention. The DSM 110 of FIG. 8 illustratively comprises a processor 810 as well as a memory 820 for storing control programs, instructions, software, advertising content and the like. The processor 810 cooperates with conventional support circuitry 830 such as power supplies, clock circuits, cache memory and the like as well as circuits that assist in executing the software routines stored in the memory 820. As such, it is contemplated that some of the process steps discussed herein as software processes may be implemented within hardware, for example, as circuitry that cooperates with the processor 810 to perform various steps. The DSM 110 also contains input-output circuitry 840 that forms an interface between the various respective functional elements communicating with the DSM 110.

Although the DSM 110 of FIG. 8 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In one embodiment of the present invention, a user interface of a front end 204 (see FIG. 2) of the media management system 130 accepts user requests for packaging, delivery, viewing build history, etc. Subsequently, a scheduler 206 (see FIG. 2) of the media management system 130 communicates the requests to the DSM 110. It should be noted that in various embodiments of the present invention, the media management system 130 accepts notifications from the Dynamic Data Files manager 120 as to when Dynamic Data Files (content) are to be delivered and also accepts status notifications from the DSM 110 (described in further detail below). In summary, in the content distribution workflow management system 100 of FIG. 1, the DSM 110 distributes messages to different components, maintains the workflow of the content distribution workflow management system 100 and maintains a status of the tasks being performed.

In the content distribution workflow management system 100 of FIG. 1, the packaging service 140 packages content playlists and programs of all types. The delivery service 170 delivers the packaged programs upon delivery requests from the DSM 110. The Dynamic Data Files manager 120 of the content distribution workflow management system 100 generates all Dynamic Data Files and contacts the DSM 110 when Dynamic Data Files are ready.

Figure 2:
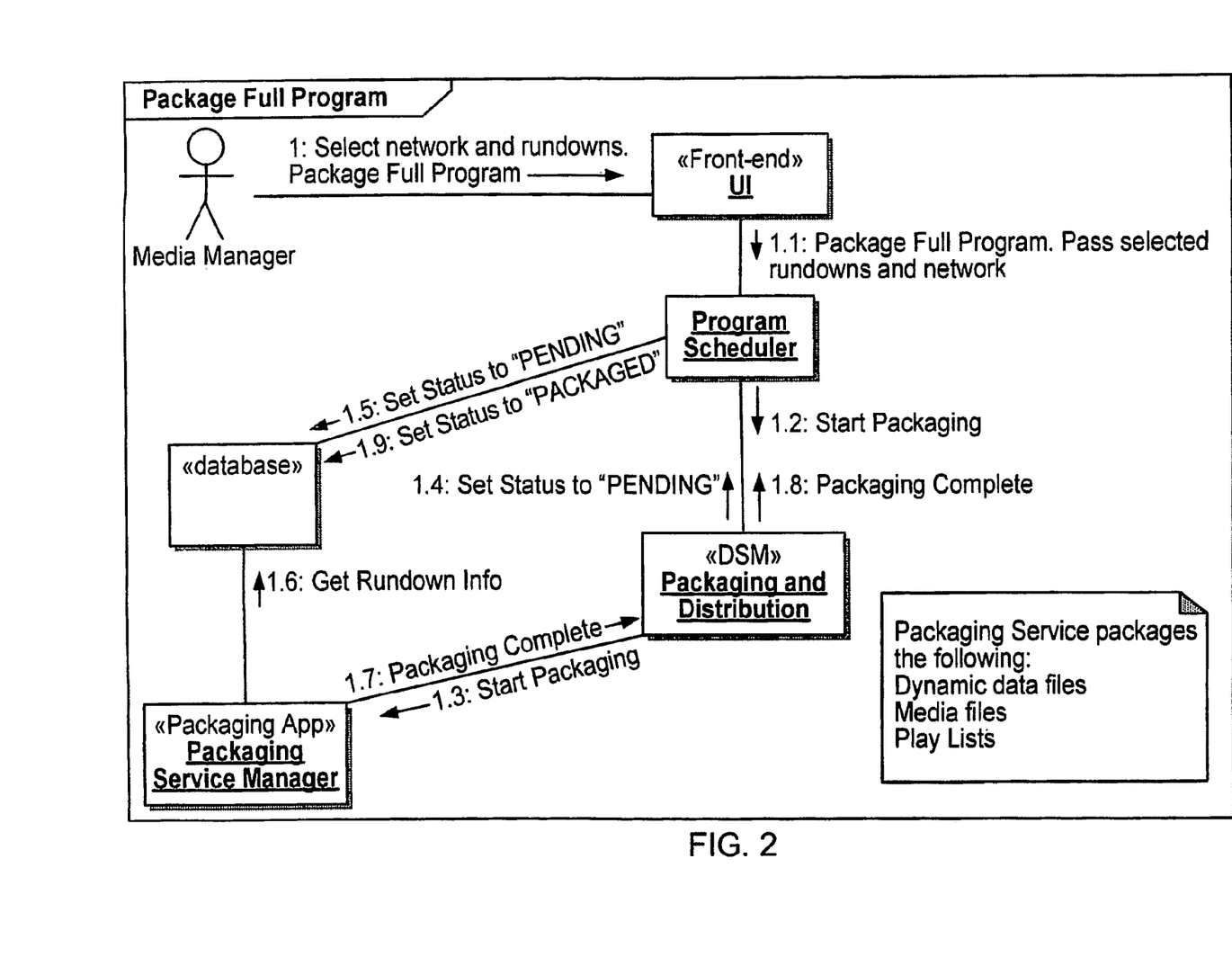
FIG. 2 depicts a block flow diagram of a packaging process in accordance with an embodiment of the present invention.

For example, FIG. 2 depicts a block flow diagram of a packaging process in accordance with an embodiment of the present invention. In the packaging process 200 of FIG. 2, a media manager 202 uses, for example, a user interface of, for example, a front end 204 of the media management system to select a final destination (e.g., a network) for which select content is intended and to select a rundown (e.g., content and programs) to be communicated to the selected final destination. That is, the user interface provides an interface for requesting packaging services. The user interface of the media management system front end 204 accepts the packaging request from the media manager 202 and a media management system program scheduler 206 communicates a request to the DSM 110 to begin the packaging process at a determined scheduled time. Upon receipt of a packaging request from the media management system program scheduler 206, the DSM 110 communicates a start packaging request to an appropriate, respective packaging service 140 and communicates an indication to the media management system program scheduler 206 that the status of the packaging request is pending. The media management system program scheduler 206 then sets a status of the packaging to pending. The packaging service 140 then accesses a media management system database 150 for fulfilling the packaging request. That is, content files such as dynamic data files, media files and playlists (e.g., a rundown), stored in the system database 150 are packaged and packaged content files are created and stored. When the packaging process is complete, the packaging service 140 notifies the DSM 110, which in turn notifies the media management system program scheduler 206. In one embodiment of the present invention, the status of the packaging request (e.g., pending or packaged) is maintained in the media management system database 150 to inform, for example, the media manager 202 of the status of the packaging request. Although in the block flow diagram 200 of FIG. 2 a single request is being processed; in alternate embodiments of the present invention multiple packaging tasks can run in parallel.

Figure 3:
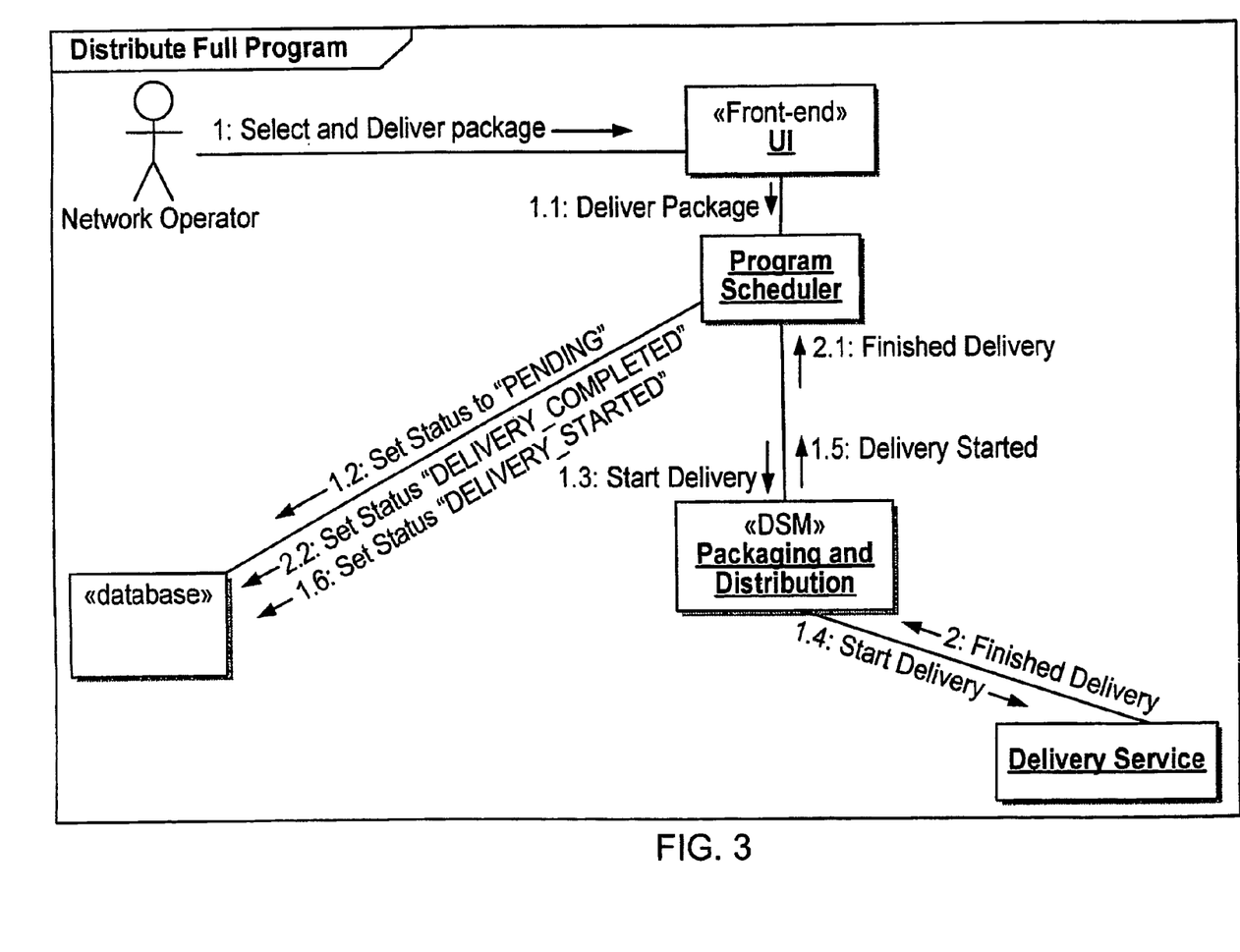
FIG. 3 depicts a block flow diagram of a delivery in accordance with an embodiment of the present invention.

FIG. 3 depicts a block flow diagram of a delivery process in accordance with an embodiment of the present invention. In the process 300 of FIG. 3, the media manager 202 via, for example the user interface of the media management system front end 204 selects packaged content to distribute. The user interface 204 accepts the delivery request from the media manager 202 and the media management system program scheduler 206 communicates to the DSM 110 a request to begin the delivery process for the selected packaged content. The media management system program scheduler 206 then sets the delivery status to 'pending'. In one embodiment of the present invention, upon receiving the delivery request, the DSM 110 communicates a start delivery request to an appropriate, respective delivery service 170 and sends an indication to the media management system program scheduler 206 that the status of the delivery request is 'delivery started'. Upon delivery of the content by the respective delivery service 170, the delivery service 170 notifies the DSM 110, which in turn notifies the media management system program scheduler 206 of the successful or unsuccessful delivery of the content. The media management system program scheduler 206 then sets the delivery status to complete. Again, in one embodiment of the present invention, the status of the delivery request is maintained in the media management system database 150 to inform, for example, the media manager 202 or other user of the status of the delivery request. Again, although in the block flow diagram 300 of FIG. 3 a single delivery request is being processed, in alternate embodiments of the present invention multiple delivery tasks can fun in parallel.

In any of the packaging and delivery processes of the present invention described herein, if a packaging process or a delivery process fails at any point, a status of the failed packaging or delivery process is set to fail and the failed packaging or delivery process is repeated until the process succeeds. Alternatively, the failed process can be repeated for a predetermined number of times or for a predetermined period of time and then the failed process can be terminated and the status remains at failed.

Figure 4A:
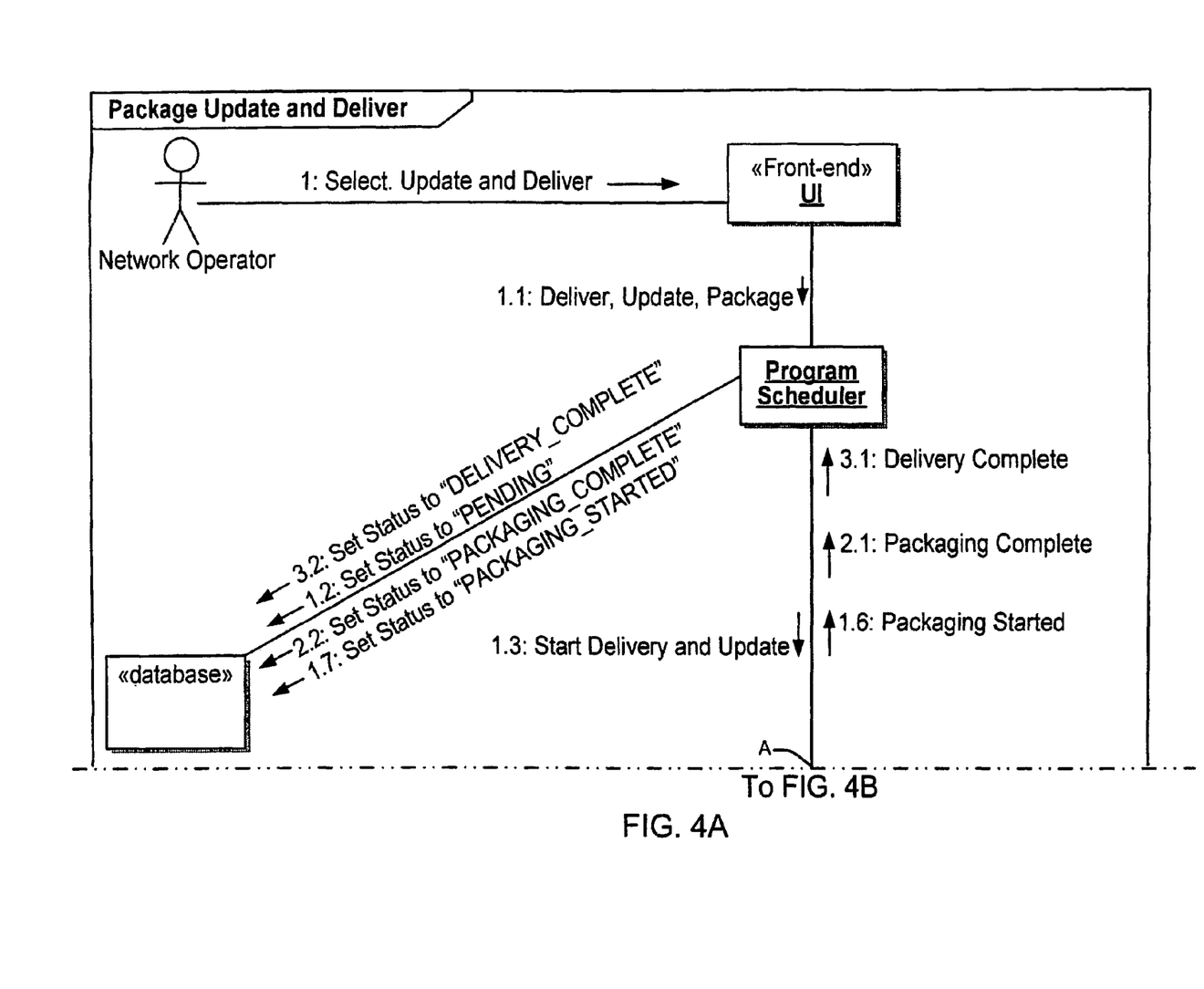
FIG. 4a and FIG. 4b, collectively (FIG. 4), depict a block flow diagram of an update and delivery process in accordance with an embodiment of the present invention.
Figure 4B:
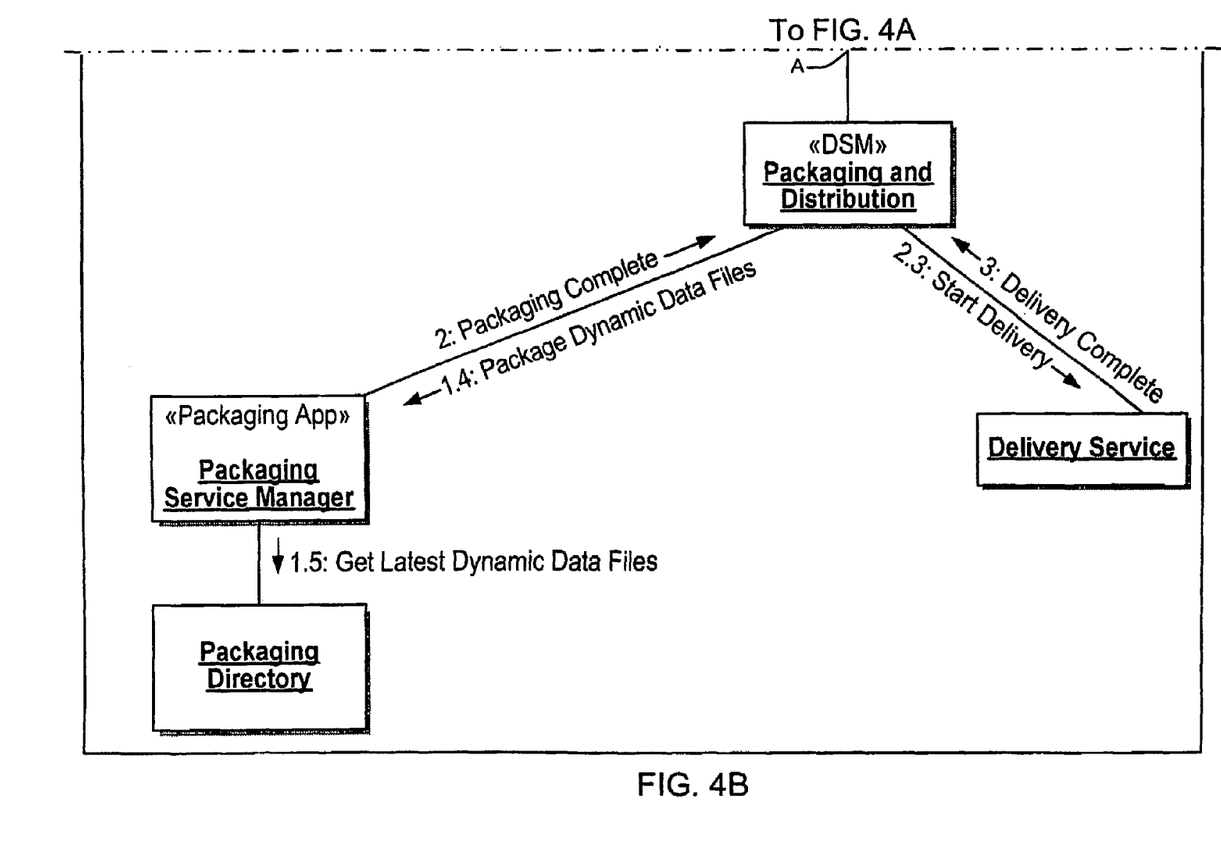

In an alternate embodiment of a delivery process of the present invention, the media manager 202 via, for example the user interface of the media management system front end 204, selects a media package to distribute. However, in this alternate embodiment, the media manager 202 can further include an update command with the delivery request. For example, FIG. 4*a* and FIG. 4*b* (collectively FIG. 4) depict a block flow diagram of an update and delivery process in accordance with an embodiment of the present invention. FIG. 4*a* depicts a portion of the update and delivery process downstream before the DSM 110 and upstream after the DSM 110 and FIG. 4*b* depicts a portion of the update and delivery process downstream after and including the DSM 110 and upstream before and including the DSM 110. In the process of FIG. 4, the user interface of the media management system front end 204 accepts the delivery request and update command from the media manager 202 and the media management system program scheduler 206 communicates to the DSM 110 a request to begin delivery of the selected package along with the update command. The media management system program scheduler 206 also sets the delivery status to pending. The DSM 110 receives the delivery request and the update command and communicates a request to the packaging service 140 to repackage the Dynamic Data Files. The DSM also communicates to the media management system program scheduler 206 that the packaging has started. At the packaging service 140 the Dynamic Data Files are re-packaged with the latest available information for the Dynamic Data Files and package files are created as described above with respect to the packaging process of FIG. 2. That is, in the embodiment of FIG. 4, the packaging service 140 obtains the latest information regarding the Dynamic Data Files from a packaging directory 305, which stores updates for content from a time at which the content was previously packaged or compiled. The Dynamic Data Files are then packaged including the latest information.

When the re-packaging/update process is complete, the packaging service) 140 notifies the DSM 110, which in turn notifies the media management system program scheduler 206. The media management system program scheduler 206 then sets that package status to complete. The DSM 110 then communicates a start delivery request to an appropriate, respective delivery service 170. Upon delivery of the content by the respective delivery service 170, the delivery service 170 notifies the DSM 110, which in turn notifies the media management system program scheduler 206 of the successful or unsuccessful delivery of the content. The delivery status is then set to complete upon successful delivery.

Figure 5:
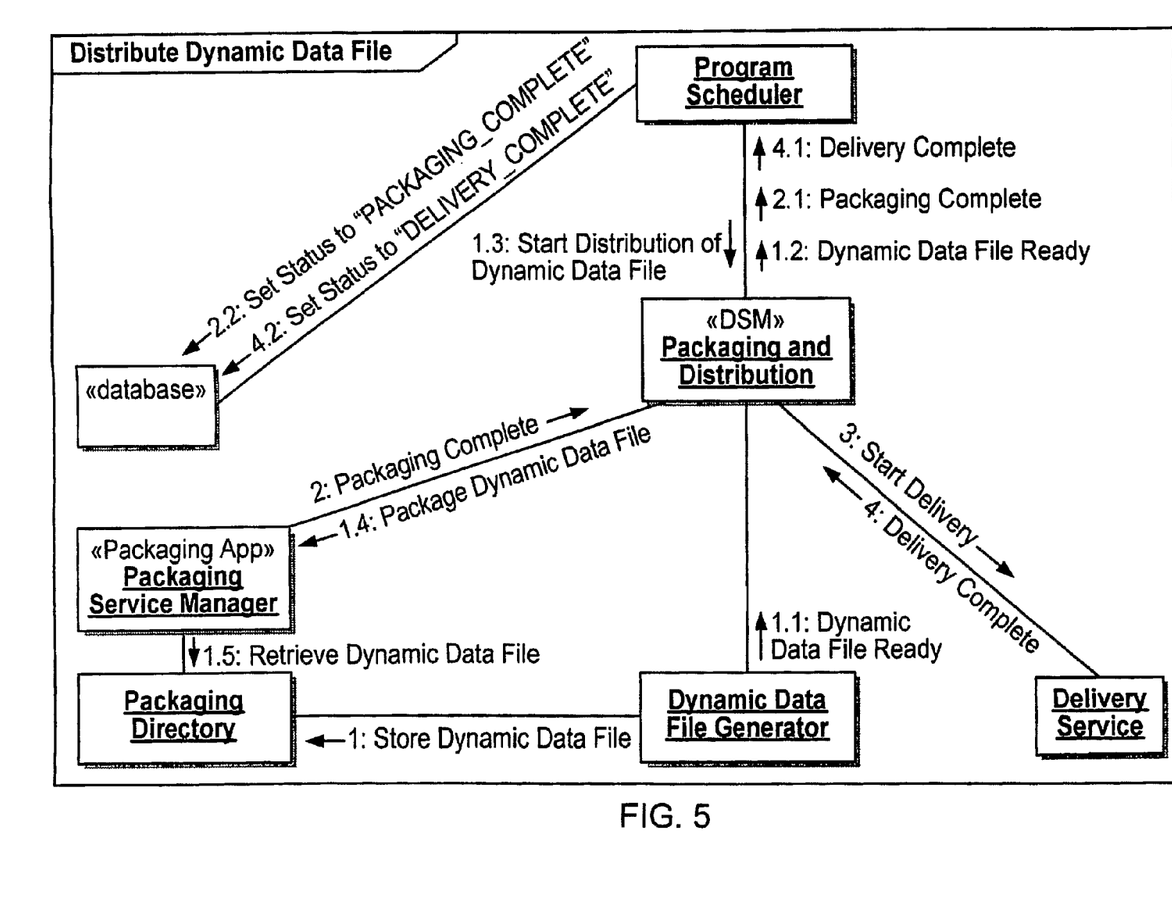
FIG. 5 depicts a block flow diagram of an automatic packaging and delivery process in accordance with an embodiment of the present invention.

In an alternate embodiment of the present invention, a DSM in accordance with the present invention can be implemented to distribute (i.e., automatically package and deliver) information/content to an intended final destination. For example, FIG. 5 depicts a block flow diagram of a distribution process in accordance with an embodiment of the present invention. The process 500 of FIG. 5 will be described with regards to the distribution of weather Dynamic Data Files, however, the present system should not be limited to only weather information. That is, substantially any content can be automatically packaged and delivered in accordance with the present invention.

In the process 500 of FIG. 5, when weather content is made ready by, for example, the Dynamic Data Files manager 120, the weather content is stored in a storage means, for example, the packaging directory 305. The Dynamic Data Files manager 120 then communicates an indication to the DSM 110 that the weather content is ready. The DSM 110 in turn notifies the media management system program scheduler 206 that the weather content is ready. The media management system program scheduler 206 then communicates to the DSM 110 a request to begin the distribution of the weather content including an indication as to which final destination(s) the weather content should be communicated. That is, in one embodiment of the present invention, the weather content is only distributed to networks that subscribe to receive custom weather content. Upon receiving the request from the media management system to begin distribution, the DSM 110 communicates a request to an appropriate, respective packaging service 140 to package the weather content. The packaging service 140 accesses the stored weather content from, for example, the packaging directory 305 for fulfilling the packaging request. In one embodiment of the present invention, an express package file is created and the weather content is not compared to previously stored weather content. When the packaging process is complete, the packaging service 140 notifies the DSM 110, which in turn notifies the media management system program scheduler 206. The media management system program scheduler 206 then sets the status of the packaging process to complete. As previously described, in various embodiments of the present invention, the status of the packaging request (i.e., pending or packaged) is maintained in the media management system database 150 to inform, for example, the media manager 202 or the Dynamic Data Files manager 120 of the status.

Furthermore, when the packaging process is complete, the DSM 110 communicates a start delivery request to an appropriate, respective delivery service 170 and can optionally send an indication to the media management system program scheduler 206 that the status of the delivery request is pending. That is, in this embodiment of the present invention, delivery of the weather content package(s) will start immediately after packaging is done without the need for any user/manager intervention. Upon delivery of the weather content package(s) by the respective delivery service 170, the delivery service 170 notifies the DSM 110, which in turn notifies the media management system program scheduler 206 of the successful or unsuccessful delivery of the content. Upon successful delivery, the media management system program scheduler 206 sets the status of the delivery process to complete.

Figure 6:
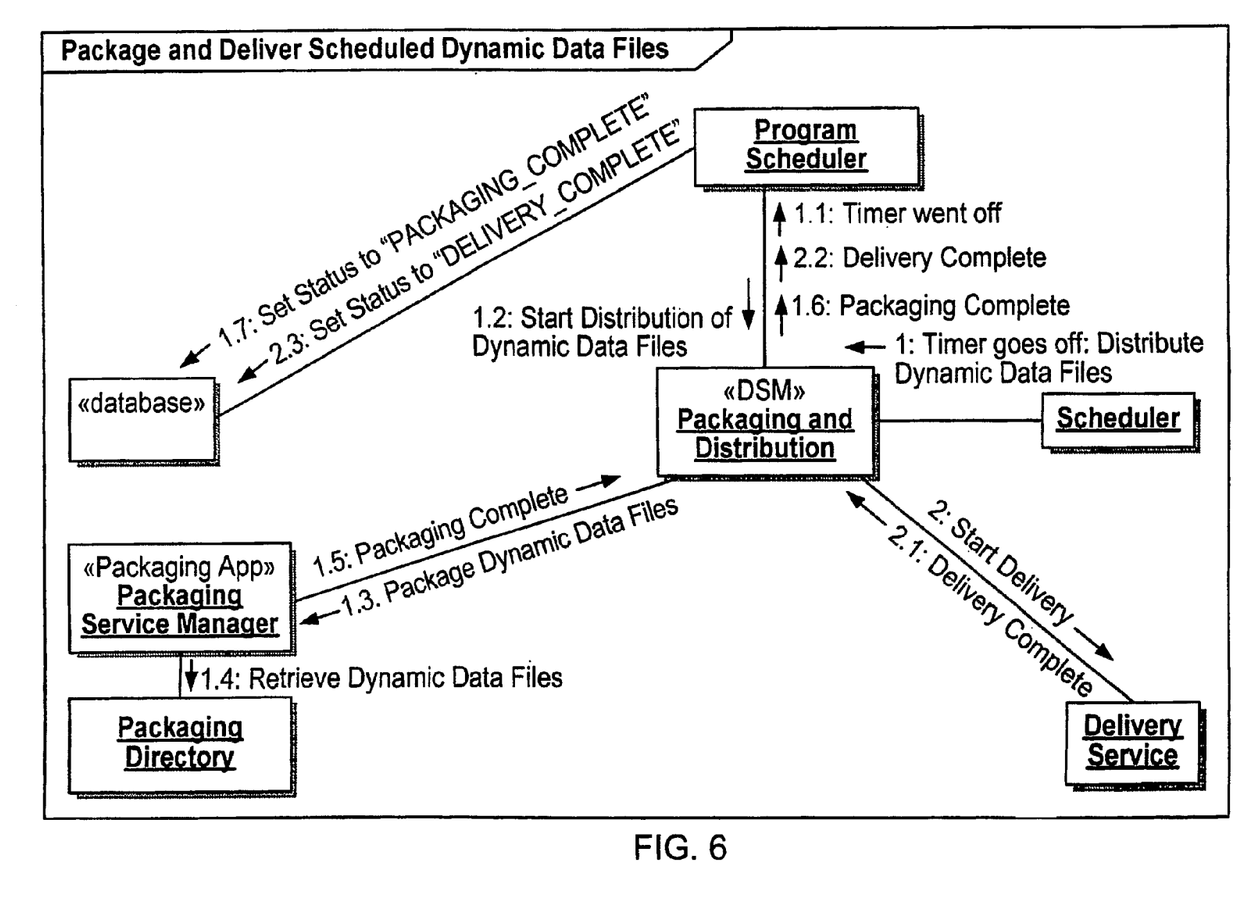
FIG. 6 depicts a block flow diagram of a scheduled packaging and delivery process in accordance with an embodiment of the present invention.

In an alternate embodiment of the present invention, a DSM in accordance with the present invention can be implemented to distribute information/content to a final destination(s) according to a schedule or timer. For example, FIG. 6 depicts a block flow diagram of a scheduled packaging and delivery process in accordance with an embodiment of the present invention. The process 600 of FIG. 6 will be described with regards to the packaging and delivery of news Dynamic Data Files according to a scheduler 602, however, the present system should not be limited to only a news content. That is, substantially any content can be packaged and delivered according to a scheduler or timer in accordance with the present invention.

In the process 600 of FIG. 6, when news content is made available by, for example, the Dynamic Data Files manager 120, and a timer goes off (e.g., time for scheduled event to occur), the scheduler 602 communicates an indication to the DSM 110 that the timer has gone off (scheduled event is ready for packaging and delivery). The DSM 110 in turn notifies the media management system program scheduler 206 that the news content timer has gone off. The media management system program scheduler 206 then communicates to the DSM 110 a request to begin the distribution of the news content including an indication as to which final destination(s) the news content should be communicated. That is, in one embodiment of the present invention, the news content is only distributed to networks that subscribe to receive custom news content.

Upon receiving the request from the media management system program scheduler 206 to begin distribution, the DSM 110 communicates a request to an appropriate, respective packaging service 140 to package the news content. The packaging service 140 accesses latest stored news content from for example, the packaging directory 305 for fulfilling the packaging request. In one embodiment of the present invention, an express package file is created and the news content is not compared to previously stored news content. When the packaging process is complete, the packaging service 140 notifies the DSM 110, which in turn notifies the media management system program scheduler 206. In various embodiments of the present invention, the status of the packaging request (i.e., pending or packaged) is maintained in the media management system database 150 to inform, for example, the media manager 202 of the status. Upon completion of the packaging process, the media management system program scheduler 206 sets the status of the packaging process to complete.

Upon completion of the packaging process, the DSM 110 communicates a start delivery request to an appropriate, respective delivery service 170 and can optionally communicate an indication to the media management system program scheduler 206 that the status of the delivery request is pending. That is, in one embodiment of the present invention, delivery of the packaged news content will start immediately after packaging is done without the need for any user/manager intervention. Upon delivery of the packaged news content by the respective delivery service 170, the delivery service 170 notifies the DSM 110, which in turn notifies the media management system program scheduler 206 of the successful or unsuccessful delivery of the content. Upon successful delivery, the media management system program scheduler 206 sets the status of the delivery process to complete. Again, in various embodiments of the present invention, the status of the delivery request is maintained in the media management system database 150 to inform, for example, the media manager of the status.

Figure 7:
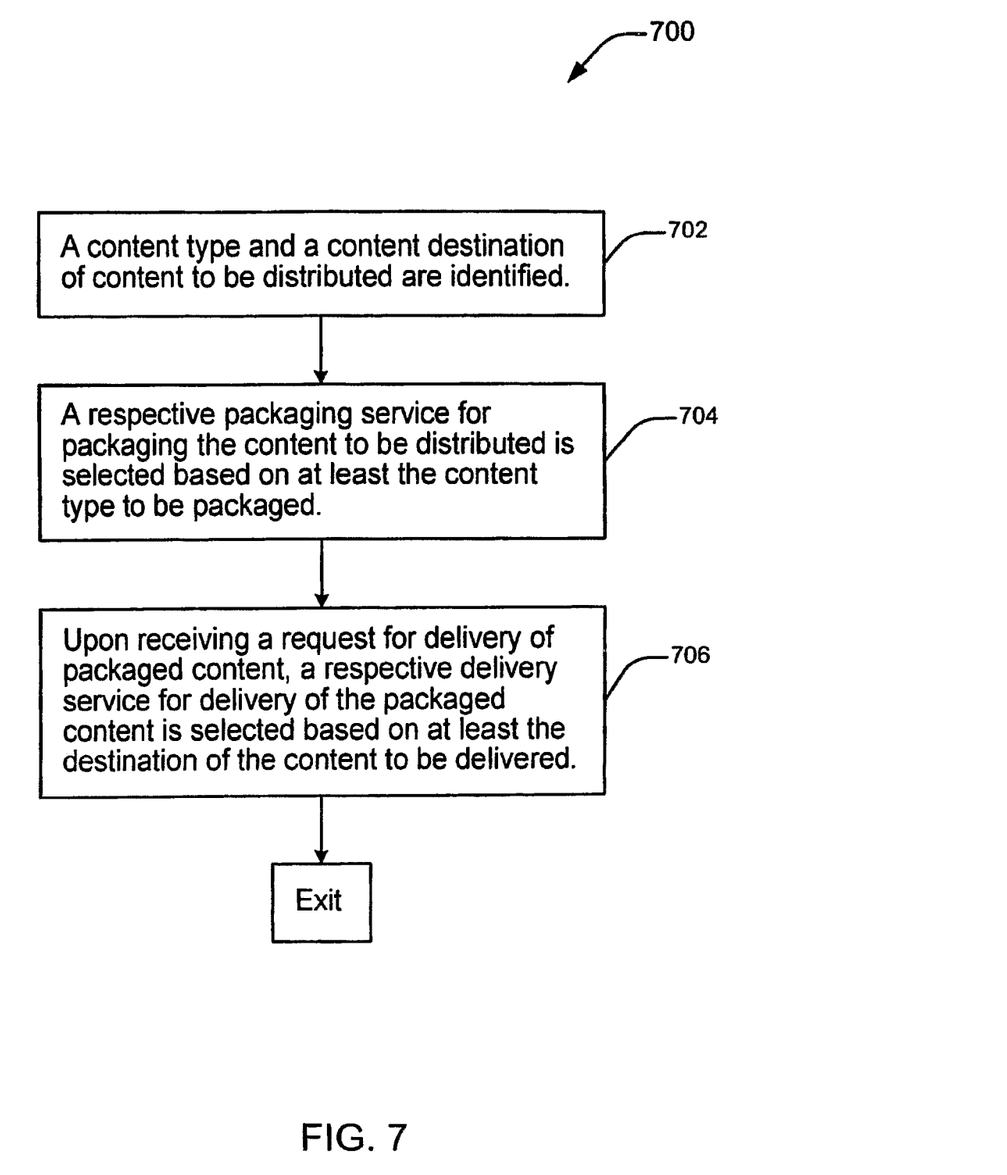
FIG. 7 depicts a flow diagram of a method for coordinated content distribution in accordance with an embodiment of the present invention.

FIG. 7 depicts a flow diagram of a method for coordinated content distribution in accordance with an embodiment of the present invention. The method 700 of FIG. 7 illustratively begins at step 702 at which a content type and a content destination are identified. That is, in one embodiment of the present invention and as described above, a user (e.g., a media manager 202) uses, for example, a user interface 204 of, for example, the media management system front end 130 to select content and programs (e.g., a rundown) to be communicated to a selected final destination (e.g., a network). The media management system program scheduler 206 then communicates a request to the DSM 110 to begin packaging the selected content and programs intended for the selected destination. Having received the package request from the media management system program scheduler 206, the DSM 110 identifies the content type and the content destination from the request from the media management system program scheduler 206. The method 700 then proceeds to step 704.

At step 704, the DSM 110 selects a respective packaging service for fulfilling the package request from the media management system program scheduler 206 based on at least the content type to be packaged. That is, and as described above, the DSM 110 selects a packaging service capable of properly packaging the selected content to be distributed to a selected final destination(s). The method then proceeds to step 706.

At step 706, upon receiving a request for delivery of packaged content, the DSM 110 selects a respective delivery service for fulfilling the received delivery request based on at least the destination of the content to be delivered. That is, and as described above, the DSM 110 selects a delivery service capable of properly delivering the selected content to a selected final destination(s). In an alternate embodiment of the present invention, the DSM can also take into account the type of content to be delivered when selecting a proper delivery service. That is, in accordance with the present invention, a plurality of delivery services can be available to a DSM of the present invention for delivering content and it is possible that a specific delivery service is required for delivering a certain content type(s).

Optionally, the DSM can maintain updates on packaging and delivery requests to maintain a record of the success or failure of packaging and delivery and any need for repackaging or redelivery of content and programs.

Having described preferred embodiments for a method, apparatus and system for coordinated distribution of content (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for coordinated content distribution, comprising:
    identifying a respective content type and destination for said content using information contained in respective playlists created for said content;
    selecting a respective packaging service for packaging said content based on at least said content type determined from information in said created playlists;
    selecting at least two respective delivery services for distribution of said content to at least said identified destination based on at least said identified destination for said content determined from information in said created playlists; and
    requesting the concurrent delivery of said packaged content to at least said identified destinations using said at least two delivery services.

2. The method of claim 1, wherein said delivery service is further selected based on said content type.

3. The method of claim 1, wherein said content type comprises dynamic data files and said content destination comprises a retail sales outlet.

4. The method of claim 3, wherein said dynamic data files comprise advertising media content.

5. The method of claim 1, further comprising updating said respective content before delivery of said content.

6. The method of claim 5, wherein said updating comprises revising said content according to current respective content information.

7. The method of claim 1, wherein content to be packaged and respective delivery destination(s) for said content are selected via a user interface.

8. The method of claim 1, wherein said respective packaging service is selected in response to a received request for packaging of content and said respective delivery services are selected in response to a received request for delivery of packaged content.

9. The method of claim 8, further comprising communicating a request for packaging of content to said selected packaging service in response to said received request for packaging.

10. The method of claim 8, further comprising communicating a request for delivery of packaged content to said selected delivery services in response to said received request for delivery.

11. The method of claim 1, further comprising maintaining a status of the progress of the packaging of the respective content.

12. The method of claim 1, further comprising maintaining a status of the progress of the delivery of the respective content.

13. The method of claim 1, wherein a request for packaging of content is automatically generated when said content is made available.

14. The method of claim 13, wherein a request for delivery of said packaged content is automatically generated upon completion of the packaging of said content.

15. The method of claim 14, wherein said packaged content is only delivered to a subscribing destination.

16. The method of claim 1, wherein a request for packaging of content is generated in response to a timer.

17. The method of claim 1, wherein a request for delivery of the packaged content is generated in response to a timer.

18. The method of claim 17, wherein said packaged content is only delivered to a subscribing destination.

19. A hardware distribution service manager for coordinated content distribution, comprising:
    a communications service device for receiving at least packaging and delivery requests and for communicating said packaging and delivery requests to at least one respective packaging and delivery service; and
    a memory for storing programs and a processor for executing said programs, said processor when executing said programs adapted to:
        identify a respective content type and destination for said content using information contained in respective playlists created for said content;
        select a respective packaging service for packaging said content based on at least said content type and communicate a packaging request for packaging of said content to said respective packaging service;
        select at least two respective delivery services for distribution of said content to at least said identified destination based on at least said destination for said content determined from information in said created playlists and communicate a delivery request for delivery of said content to said respective delivery service; and
        request the concurrent delivery of said packaged content to at least said identified destinations using said at least two delivery services.

20. The distribution service manager of claim 19, wherein said distribution service manager is adapted to maintain a status of the progress of the packaging of said content.

21. The distribution service manager of claim 19, wherein said distribution service manager is adapted to maintain a status of the progress of the delivery of packaged content.

22. The distribution service manager of claim 19, wherein said distribution service manager is adapted to select a respective packaging service and communicate a request for packaging of said content to said selected packaging service in response to a received request for packaging of said content.

23. The distribution service manager of claim 19, wherein said distribution service manager is adapted to select a respective delivery service and communicate a request for delivery of packaged content to said selected delivery service in response to a received request for delivery of packaged content.

24. The distribution service manager of claim 19, wherein said distribution service manager is adapted to automatically generate a request for packaging of content when said content is made available and to communicate said request to a respective packaging service.

25. The distribution service manager of claim 24, wherein said distribution service manager is adapted to automatically generate a request for delivery of said packaged content upon completion of the packaging of said content and to communicate said request to a respective delivery service.

26. The distribution service manager of claim 19, wherein said distribution service manager is adapted to generate a request for packaging of said content in response to a timer and to communicate said request to a respective delivery service.

27. The distribution service manager of claim 26, wherein said distribution service manager is adapted to generate a request for delivery of said packaged content in response to a timer and to communicate said request to a respective delivery service.

28. A system for coordinated content distribution, comprising:
- a content manager for generating and organizing content;
- a media management system including:
  - a user interface for enabling user inputs including at least the selection of content and a destination for said content to be delivered using information contained in respective playlists created for said content;
  - a scheduler for affecting the delivery of said selected content by communicating a packaging and delivery request for said selected content to a distribution service manager; and
  - a database for storing at least said generated and organized content and packaging and delivery status information;
- at least one packaging service for packaging respective content;
- at least one delivery service for delivering respective content; and
- a distribution service manager including:
  - a communications service device for receiving said packaging and delivery requests from said media management system and for communicating said packaging and delivery requests to at least one of said respective packaging and delivery services, respectively; and
  - a memory for storing programs and a processor for executing said programs, said processor when executing said programs adapted to:
  - identify a respective content type and destination for content to be packaged and delivered;
  - select a respective packaging service for packaging said content based on at least said content type and communicate a packaging request for packaging of said content to said respective packaging service;
  - select at least two respective delivery services for distribution of said content to at least said identified destination based on at least said destination for said content determined from information in said created playlists and communicate a delivery request for delivery of said content to said respective delivery service; and
  - request the concurrent delivery of said packaged content to at least said identified destinations using said at least two delivery services.

\* \* \* \* \*